Oct. 13, 1959
F. E. BROWN
2,908,601
MANUFACTURE OF INTERNAL PRESSURE-RUPTURABLE
SEAL IN THERMOPLASTIC TUBING
Filed May 16, 1957
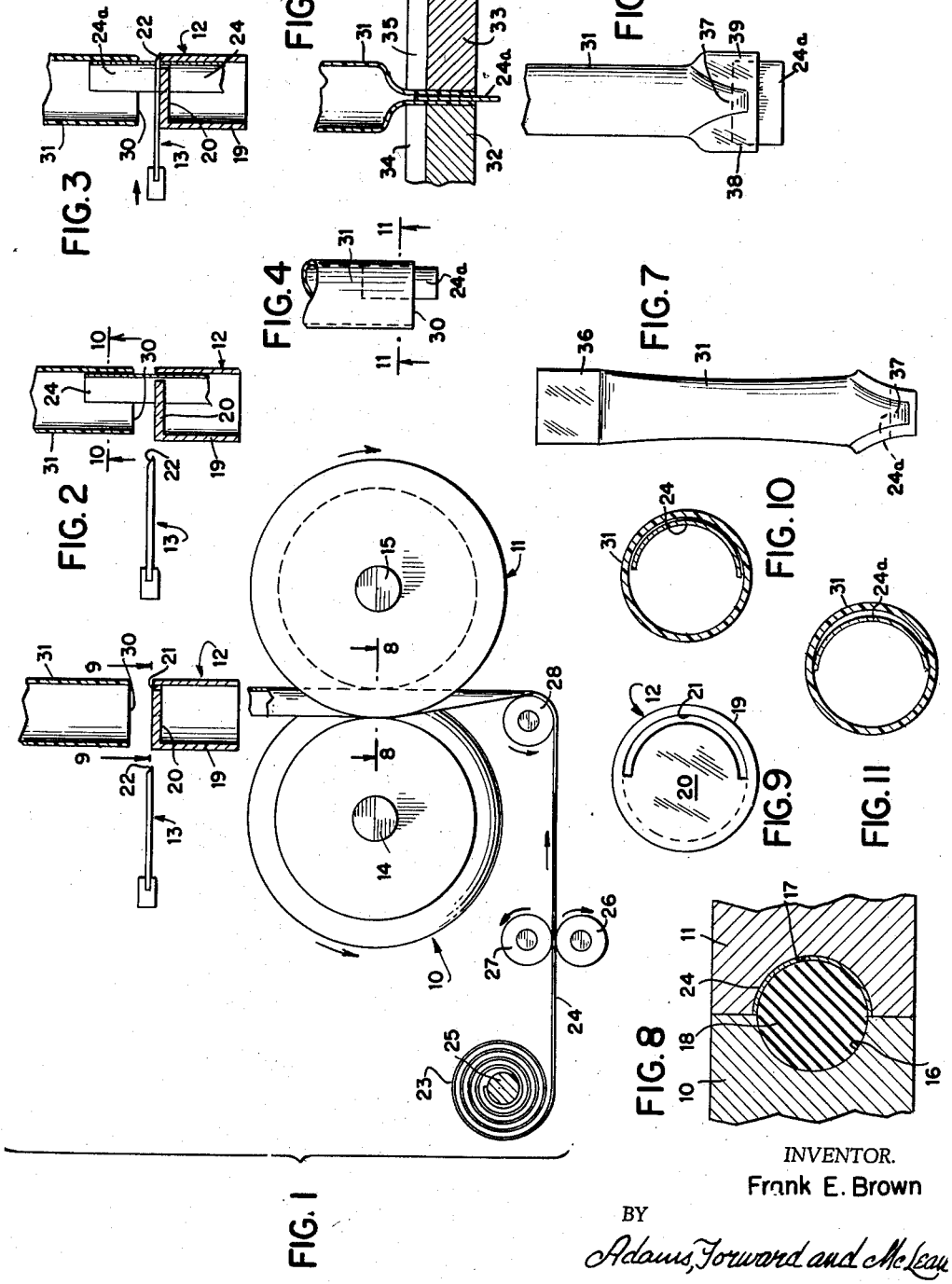
INVENTOR.
Frank E. Brown
BY
Adams, Forward and McLean
ATTORNEYS

United States Patent Office 2,908,601
Patented Oct. 13, 1959

2,908,601

MANUFACTURE OF INTERNAL PRESSURE-RUP-TURABLE SEAL IN THERMOPLASTIC TUBING

Frank E. Brown, Glendale, Calif., assignor to Unette Corporation, Burbank, Calif., a corporation of Delaware Application May 16, 1957, Serial No. 659,634

3 Claims. (Cl. 154—116)

My invention relates to frangible closures for thermoplastic materials and in particular provides a method for forming in tubular thermoplastic stock frangible seals of the type disclosed in my copending application Serial No. 587,671, filed May 28, 1956. My invention has particular advantage in providing internal pressure-rupturable seals for dispensing-type capsules or containers such as are disclosed and claimed in my Patent No. 2,663,461.

It is frequently desirable to provide a passageway with a seal which can be broken readily to open the passageway, for example by application of internal, fluid pressure behind the seal. One particular use of such frangible seals is for closing the discharge passageway of a small collapsible container suitable for containing and dispensing a single dosage of a medicament or the like. In my above noted copending application I have shown that such seals can be formed with particular advantage between two layers of flexible thermoplastic material by including a strip of foreign material between the thermoplastic surfaces to be joined followed by pressuring and heating the thermoplastic material to welding (fusing) temperatures. An imperfect weld results in which the opposite faces of the strip of foreign material adhere to the confronting surfaces of the thermoplastic material providing an air-tight, moistureproof seal between the thermoplastic surfaces which can be readily opened by peeling apart the two layers of thermoplastic material.

It is a particular object of my present invention to provide a method for forming such seals in tubular passageways. More particularly it is an object of my present invention to provide such a method which can be readily performed by automatic machines of the type generally used in forming dispensing containers from tubular thermoplastic stock. It is also an object of my invention to provide such a method which permits accurate adjustment of the positioning of the strip of foreign material in order to assure uniform rupturing characteristics in the finished seal.

In another aspect, it is further an object of my present invention to provide an improved frangible closure for tubular stock of the type generally described and claimed in my aforenoted copending application, in which the frangible closure can be accurately set to rupture at any desired internal pressure of a fluid confined by the tubular stock.

These and other objects of my invention are generally accomplished using normally flat, somewhat resilient sheet material as the foreign material for forming the seal. The seal is formed in flexible tubing by holding a strip of such sheet material, which has a normally flat transverse dimension larger than the internal diameter of the tubular stock, in transversely curled position such that opposite longitudinal edges of the sheet are brought together sufficiently to reduce the distance between them to a dimension less than the internal diameter of the tubing. While the strip is so positioned, it is inserted lengthwise into an end of the flexible tubing which is to be sealed and thereupon is released so that the strip in tending to flatten expands into frictional engagement with the inner wall of the tubing and thus is retained in the tubing. Pressure is then applied externally to the walls of the tubing from opposite sides at the position of the strip to flatten the tubing against opposite faces of the strip. While the tubing is thus flattened, it is heated transversely of the flattened portion in a conventional manner, for example by radio frequency, dielectric heating, to welding temperature, causing the surfaces of the tubing adjacent to the strip to adhere to the strip forming the rupturable seal described in my above noted copending application.

In a more specific aspect, the application of pressure and welding heat in addition to being made transversely across the tubing is also carried back lengthwise of the tubing along opposite edges of the flattened portion for a short distance, forming a central V-shaped notch of unsealed tubing including a portion of the strip of flat sheet material. The seal thus formed is trimmed transversely below the notch and along both sides of the notch to leave a V-shaped flat portion around the end of the notch such that there is an unsealed portion, the notch, of the tubular material which is enclosed on three sides by a frangible seal.

This last structure I have found can be duplicated repeatedly with substantially uniform rupturing pressure characteristics, thus making possible the mass production of dispensing type containers of the type disclosed and claimed in my above noted patent, each of which will open at substantially the same internal fluid pressure. I have found, moreover, holding other dimensions constant and employing the same materials, that the internal rupturing pressure can be predetermined at any desired value within a wide range simply by adjustment of the longitudinal position of the strip material, that is, by controlling the amount of strip material which extends into the open center of the notch.

For a more complete understanding of the principles of my invention, reference is made to the appended drawings in which:

Figure 1 is a diagrammatic, partly sectioned view of an apparatus for carrying out the method of my invention showing an end of a piece of tubular stock and a roll of strip material prior to insertion of the strip in the end of the tube;

Figure 2 is a fragmentary view similar to Figure 1 illustrating the positioning of the strip material in the end of the tube;

Figure 3 is a view similar to Figure 2 illustrating the release of the strip material from curled position in the end of the tube;

Figure 4 is an elevational view of the end of the tube retaining the released strip material;

Figure 5 is a fragmentary sectional view of the end of the tube, flattened between a pair of welding jaws;

Figure 6 is a fragmentary elevational view of the seal formed after welding;

Figure 7 is an elevational view of a finished container having the seal formed by the method illustrated in Figures 1–5;

Figure 8 is a fragmentary cross-section taken at line 8—8 in Figure 1;

Figure 9 is a plan view of a portion of the apparatus shown in Figure 1, taken at line 9—9 in Figure 1;

Figure 10 is a cross-sectional view of the tube end and strip material seen at line 10—10 in Figure 2; and Figure 11 is a view similar to Figure 10 after release of the strip material in the tube end and taken at line 11—11 in Figure 4.

Referring particularly to Figure 1, a suitable apparatus for carrying out my invention includes a pair of peripherally contacting wheels 10 and 11, a guide 12 and a blade 13. Wheels 10 and 11 are mounted for rotation about parallel horizontal axes on shafts 14 and 15, respectively, and are each circumferentially grooved as indicated by the reference letters 16 and 17, respectively (see Figure 8). Grooves 16 and 17 are of semi-circular cross-section, the diameter of groove 17 in wheel 11 being just slightly greater than that of groove 16 in wheel 10. A rubber O-ring 18 is tightly received in groove 16, and wheels 10 and 11 mate at their circumferences such that ring 18 is received in groove 17 at the place of contact of wheels 10 and 11, leaving a thin space between ring 18 and groove 17 of semi-annular cross-section.

Guide 12 includes a vertical cylindrical tube 19 and integral flat top 20 closing the upper end of tube 19. Top 20 is provided with a semi-annular slit 21 having approximately the dimensions of the semi-annular space defined between rubber ring 18 and groove 17 at the place of contact of wheels 10 and 11. Guide 12 is positioned such that slit 21 is vertically aligned with the semi-annular space between ring 18 and groove 17.

Blade 13 is mounted for horizontal reciprocation with the plane of the blade disposed horizontally just above the surface of top 20 of guide 12. Means are provided for reciprocating blade 13 from a position removed from guide 12 (see Figures 1 and 2) to a position across top 20 (see Figure 3) such that the cutting edge 22 of blade 13 crosses slit 21.

In operation, a roll 23 of waxed paper strip 24 is mounted on a spool 25 and arranged to pass between a pair of cooperating drive rolls 26 and 27, which suitably are made of rubber. Paper strip 24 then passes around an idler roll 28 and is fed through the semi-annular space between ring 18 on wheel 10 and groove 17 on wheel 11. The driving mechanism for wheels 10 and 11 is preferably synchronized with the driving mechanism of rolls 26 and 27 in order to avoid placing any tension other than that required to take up slack on strip 24. In the latter regard, idler roll 28 preferably is spring mounted to place the necessary light tension on paper strip 24. Paper 24, after passing between rolls 10 and 11, extends upwardly into cylindrical portion 19 of guide 12 and then extends through slit 21.

With the strip of waxed paper 24 thus mounted and threaded, and with the drive mechanisms for rolls 26 and 27 and wheels 10 and 11 operating to feed strip 24 continuously through slit 21 at a relatively slow rate, the open end 30 of a short length 31 of tubular thermoplastic stock from which it is desired to fabricate a container is positioned spaced above top 20 of guide 12. Typically, tube 31 is formed from vinylidene chloride-vinyl chloride copolymer and has a wall thickness of about 20 thousandths of an inch. Different thermoplastic materials can of course be employed and wall thicknesses can range typically up to one-eighth of an inch.

The inside diameter of tube 31 determines the diameter of groove 17 and of slit 22. Thus a typical tube 31 may have an inside diameter of about one-quarter inch, in which case the diameters of slit 21 and of groove 17 would be approximately seven thirty-seconds of an inch, and the width of waxed paper strip 24 would be approximately one-third inch.

It will be noted that as strip 24 feeds upwardly (see Figure 1), a transverse curl is imparted to it as it passes between wheels 10 and 11, this curl being retained by the curvature of slot 21 in guide 12. Thus with tube 31 positioned over guide 12, strip 24 is extended into the open end 30 of tube 31 (see Figure 2), just clearing the inner walls of tube 31 (see Figure 10). When the strip 24 has reached the desired height in tube 31, blade 13 is reciprocated across top 20 of guide 12, slicing off a short length 24a of strip 24 which at its upper end lies in tube 31 (see Figure 3). Since the waxed paper stock from which strip 24 is formed is flexibly resilient, as soon as blade 13 cuts off strip 24a, strip 24a tends to uncurl allowing it to expand into contact with the inner walls of tube 31 (see Figures 4 and 11); thereby tube 31 retains strip 24a.

In a typical container fabricating machine, the sections 31 of plastic tubing are secured in suitable clamping devices around an indexing table at one station of which guide 12 is positioned. The operation of blade 13 is synchronized with the operation of the table such that as blade 13 slices off strip 24a, the table moves to the next indexed station and blade 13 is rapidly withdrawn allowing strip 24 to continue to feed upwardly into a new tube 31 which was brought into position as the first tube was carried away by the movement of the indexing table.

The tube 31 having the slightly expanded strip 24a retained in end 30 is next brought between a pair of open welding jaws 32 and 33 which are horizontally reciprocable toward each other and which are connected as electrodes in the output circuit of a radio frequency, dielectric welding device. Jaws 32 and 33 are suitably shaped with deep horizontally extended V-notches 34 and 35, respectively, in their upper surfaces which lead into confronting faces of jaws 32 and 33. Jaws 32 and 33 are thereupon closed upon opposite sides of end 30 of tube 31 (see Figure 5) flattening end 30 against opposite faces of strip 24a, with the upper end of strip 24a extending slightly into the V-notched portions 34 and 35 of the closed jaws, thus imparting a shape to the lower end 30 of tube 31 substantially as shown in Figure 6. The radio frequency welding device is then energized to heat the thermoplastic material forming tube 31 to welding temperature whereupon the wall portions of tube 31 flattened between jaws 32 and 33 weld together where they touch each other, and adhere to strip 24a where they touch it. Jaws 32 and 33 are thereupon opened and the tube 31 is thereafter carried to a filling operation and a further sealing operation in which the upper end 36 of tube 31 is welded together to form a permanent closure.

The lower end 30 of tube 31 as it is removed from welding jaws 32 and 33 has an extended, flattened appearance (again see Figure 6), with a deep V-notch 37 of unsealed tubular material extending down into the welded area and including a portion of strip 24a which was positioned in the space between V-notches 34 and 35 during the welding operation. Portion 37 thus forms a container neck and a potential expelling passage for the contents of a container formed from tube 31. The flattened portions 38 and 39 lying on each side of neck 37 and the externally projected tip of strip 24a are then trimmed to the shape shown in Figure 7 in which the expelling neck 37 at its tip is sealed on all three closed sides by the frangible type closure of my present invention. This variation of the closure of my aforenoted copending application, as suggested above, is highly advantageous since the distance to which strip 24a extends into the open neck 37 portion of container 31 determines the internal fluid pressure required to peel the thermoplastic layers from the waxed paper strip and thus rupture the seal. Hence a container can be fabricated with any desired degree of internal fluid pressure for rupture.

Although I have described my invention with reference to a specific container shape and specific materials, it will be readily evident that many variations are possible in the shape of the container and that other materials can be employed as, for example, is suggested in my aforenoted copending application. Generally tubular stock 31 can be any flexible, resilient material which can be welded and strip 24 can be formed of any thin material which has a porous surface in the sense that the welded tubular material can flow into the surface of the strip material to adhere to it. Thus in the case of waxed paper, I believe the heating of the thermoplastic tubular material also fuses the wax on the paper, causing the wax and thermoplastic to mingle and allowing the thermoplastic material to flow into the pores of the paper strip. I have also formed containers of the type described above, using a variety of strip materials and even metal foil, which has a sufficiently porous surface for the purposes of my invention. I prefer, however, in most instances that the strip material should be waxed paper since it is inert and non-permeable to most fluids.

I claim:

1. A method for forming rupturable seal in flexible heat weldable thermoplastic tubing which includes holding a strip of normally flat resilient sheet material different from said thermoplastic and having a transverse dimension greater than the internal diameter of tubing to be sealed with the longitudinal edges of said strip curled toward each other to reduce the transverse measurement between said longitudinal edges to a dimension less than the internal diameter of said tubing, inserting the curled strip lengthwise into an open end of said tubing, releasing said strip whereby said strip tends to flatten and thereby to expand the transverse dimension between the longitudinal edges thereof frictionally to engage said strip with the inner wall of said tubing and retain said strip in said tubing, externally applying pressure to the walls of said tubing from opposite sides thereof at the position of said strip to flatten said tubing against said strip with a portion of said strip extending into said tubing beyond the area of application of the externally applied pressure, and heating the flattened tubing to welding temperature to cause the opposite inner wall portions of said tubing to adhere to the faces of said strip against which said wall portions are pressed, thereby forming a seal across said tubing which is rupturable by application of pressure to a fluid in said tubing.

2. A method according to claim 1 in which application of externally applied pressure to the walls of the tubing is controlled to flatten said tubing transversely and back lengthwise of the tubing along the opposite edges of the thereby flattened portion to form an unpressed V-shaped notch in which said portion of said strip terminates and in which, following the heating of the flattened tubing to welding temperature, the seal thereby formed is trimmed transversely below the base of said V-shaped notch and along both sides of said notch to leave a V-shaped flat portion.

3. A method for forming a rupturable seal in flexible, heat weldable thermoplastic tubing which includes curling the end of an indefinite length of normally flat resilient sheet material different from said thermoplastic and having a transverse dimension greater than the internal diameter of tubing to be sealed to bring the longitudinal edges of said strip toward each other and reduce the transverse measurement between said edges to a dimension less than the internal diameter of said tubing while at the same time inserting the curled end of said length of sheet material lengthwise into an open end of said tubing, cutting said curled end adjacent the open end of said tubing to release a strip of said curled portion of said indefinite length which strip thereupon tends to flatten and expand the transverse dimension between the longitudinal edges thereof frictionally to engage said strip with the inner wall of said tubing and retain said strip in said tubing, externally applying pressure to the walls of said tubing across the portion of said tubing in which said strip is retained and from opposite sides of said tubing to flatten said tubing against said strip with an end of said strip extending into said tubing beyond the area of application of externally applied pressure, and heating the flattened tubing to welding temperature to cause the opposite inner wall portions of said tubing to adhere to the faces of said strip against which said wall portions are pressed, thereby forming a seal across said tubing, which is rupturable by application of pressure to a fluid in said tubing.

References Cited in the file of this patent

UNITED STATES PATENTS

| | | |
|---|---|---|
| 2,335,159 | Salfisberg | Nov. 23, 1943 |
| 2,364,903 | Howard | Dec. 12, 1944 |
| 2,387,738 | Bogoslowsky | Oct. 30, 1945 |
| 2,648,463 | Scherer | Aug. 11, 1953 |
| 2,663,461 | Brown | Dec. 22, 1953 |
| 2,665,033 | Robertson | Jan. 5, 1954 |
| 2,702,146 | Land | Feb. 15, 1955 |

FOREIGN PATENTS

| | | |
|---|---|---|
| 204,022 | Australia | Nov. 1, 1956 |